United States Patent [19]
Harris

[11] Patent Number: 5,144,538
[45] Date of Patent: Sep. 1, 1992

[54] ILLUMINATED TAIL LIGHT HANDLE

[75] Inventor: Gary Harris, Wilsonville, Oreg.

[73] Assignee: Harris, Sanchez & Sandifer, Orange, Calif.

[21] Appl. No.: 803,107

[22] Filed: Dec. 5, 1991

[51] Int. Cl.$^5$ .............................................. B60Q 1/00
[52] U.S. Cl. ..................................... 362/80; 362/100; 70/237; 340/479
[58] Field of Search ................ 362/83.3, 80, 100, 154, 362/253, 806; 296/50, 51; 340/479; 70/208, 209, 237

[56] References Cited

U.S. PATENT DOCUMENTS

| | | | |
|---|---|---|---|
| 4,745,525 | 5/1988 | Sheehy | 362/80 X |
| 4,839,629 | 6/1989 | Brown | 340/479 X |
| 4,896,136 | 1/1990 | Hotovy | 362/80 X |
| 5,025,352 | 6/1991 | Brown | 362/83.3 |

*Primary Examiner*—Stephen F. Husar
*Attorney, Agent, or Firm*—Hawes & Fischer

[57] ABSTRACT

A handle structure that fits on the tail gate or utility opening on a vehicle and is illuminated in concert with the tail light system of the vehicle to also act as a third tail light. The combination tail light handle is also mountable opposite the tail gate latch to facilitate the operation of the tail gate latch and opening of the tail gate or utility door. The combination tail light handle utilizes a lens for light dispersion mounted at sufficient angle to transmit light rearwardly of the vehicle regardless of whether the tail gate or utility door is in the open or closed position.

11 Claims, 4 Drawing Sheets

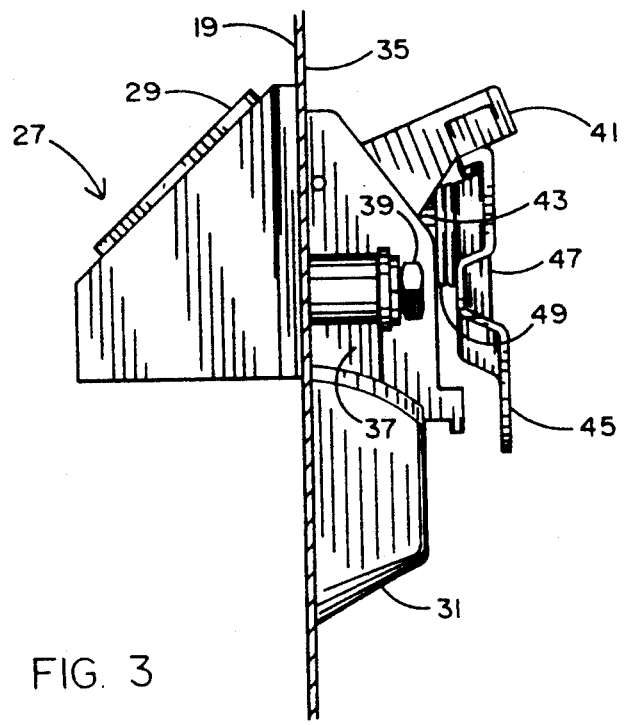
FIG. 3
FIG. 4
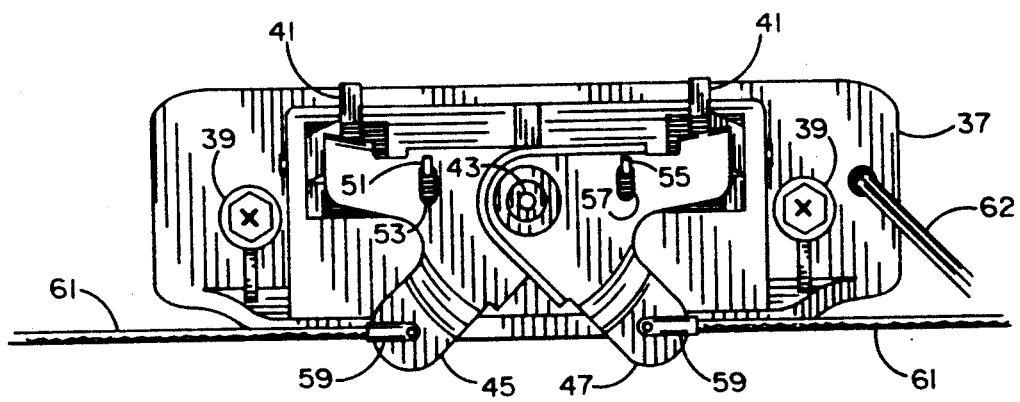

ILLUMINATED TAIL LIGHT HANDLE

BACKGROUND OF THE INVENTION

This invention relates generally to handles for facilitating manual control of doors and gates, and more particularly to a rearwardly observable handle for a rear opening for a vehicle, and having an illuminated surface utilizable as a third or additional tail light.

Conventional vehicles usually have a pair of body mounted spaced apart tail lights which operate as both running lights at night and as brake lights in both daylight and night conditions. Those body mounted tail lights alone have been used for many years, but in recent times heightened safety awareness has necessitated the introduction of a so called third tail light to motor vehicles. Examples of additional lighting on vehicles includes U.S. Pat. Nos. 4,365,232; 4,745,430; 4,745,525; 4,800,471 and 4,839,629.

The third tail light is usually mounted vertically higher than the body mounted tail lights and is intended to be viewable from a vertically higher vantage point than the body mounted tail lights alone. The vertically high mounting of the third tail light is naturally within the field of view of following vehicles.

In automobiles, the third tail light is typically positioned within the rear passenger portion of the vehicle and against the rear wind shield. The third tail light is then visible even from a vehicle following so closely that the front of the following vehicle obscures the body mounted tail lights.

In the case of a truck or utility vehicle having a tail gate or utility door, the positioning of a third tail light poses a more significant problem. In most cases there is no rearwardly located windshield and nearby support structure to facilitate the inside mounting of a third tail light. The mounting of a third tail light within the tail gate or rear access door of a vehicle requires an additional opening to be cut within the tail gate or door structure. Additional openings compromise the structural integrity of the supporting structure in which the opening is made. Further, an additional opening provides a further interface with the external environment which must be sealed or else risk corrosion.

Further, during operation of vehicles with tail gates or rear utility doors, it is well known that the vehicle is often operated with the utility door or tailgate in the open position, especially during the hauling of materials. A body mounted third tail light will not be significantly visible during the times when the vehicle is operated with the tail gate or utility door in the open position.

A third tail light is needed which will be visible regardless of the position of the tail gate or utility door to which it is attached. Ideally a third tail light should not require additional openings to be cut into its support structure for mounting on a vehicle. A third tail light should be amenable to factory mounting on a new vehicle as well to mounting on older vehicles.

SUMMARY OF THE INVENTION

The invention combines a third tail light into a handle structure which is especially useful in combination with a tail gate latch opener. The combination tail light handle is mounted opposite the tail gate latch, and facilitates the operation of the tail gate latch and opening of the tail gate or utility door. The combination tail light handle utilizes a light bulb within an illumination cavity, and a lens for light dispersion. The lens is at a sufficient angle to transmit light rearwardly of the vehicle on which it is mounted regardless of whether the tail gate or utility door is in the open or closed position. Further, the illuminated tail light handle of the present invention is well suited for a wide variety of uses including doors utilized with aircraft, busses, trains, and storage bins of all types.

BRIEF DESCRIPTION OF THE DRAWINGS

The above mentioned and other features of this invention will become more apparent by reference to the following description taken in conjunction with the accompanying drawings in which:

FIG. 3 is a partial sectional view of the combination tail light handle of FIGS. 1 and 2 shown in conjunction with a latch handle assembly, viewed along line 3—3 of FIG. 2;

FIG. 4 is a rearward view of the latch actuation housing portion of the latch handle assembly illustrated in FIG. 3;

FIG. 5 is a side sectional view of the combination tail light handle and latch assembly taken along line 5—5 of FIG. 2, and illustrating manual operation of the latch handle assembly of FIG. 3;

FIG. 6 is a side view of the tailgate of FIG. 1 illustrating the vertical, closed tail gate position; and, FIG. 7 is a side view similar to that shown in FIG. 6 illustrating the horizontal, open tail gate position.

DETAILED DESCRIPTION OF THE PREFERRED EMBODIMENT

Figure 7:
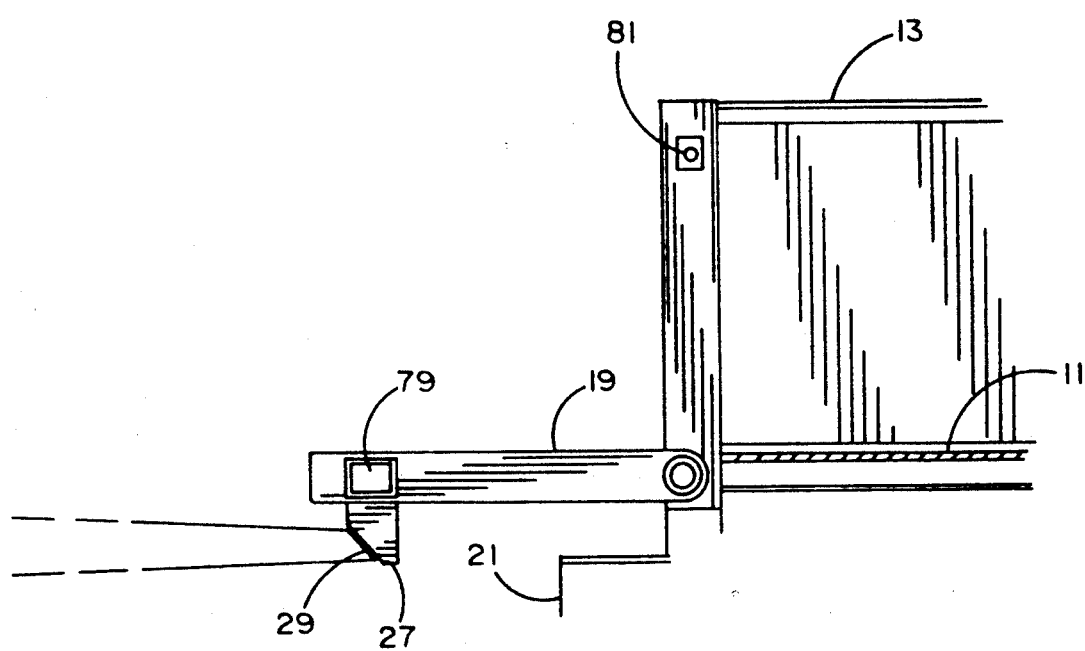
Figure 7:
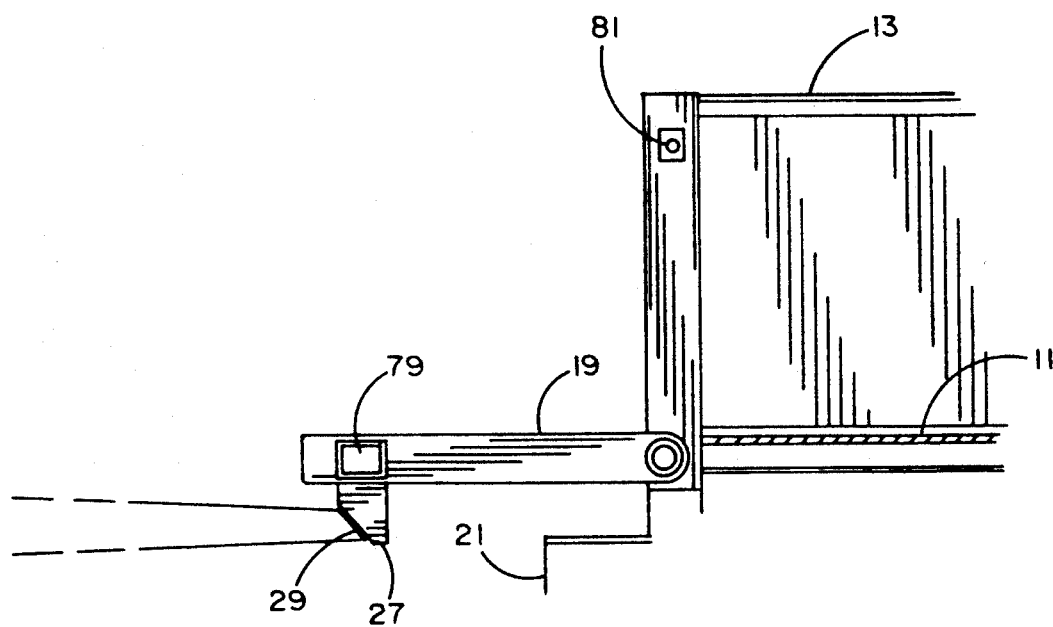

The tail gate handle of the present invention is first illustrated with reference to FIG. 1. A truck, not shown in its entirety, has a utility bed 11 bordered by side walls 13 and a wheel well 15. At the rearward face of the truck, a pair of spaced apart tail lights 17 are body mounted into the ends of the side walls 13. Tail lights 17 are well known and operate in a well known manner both as running lights and brake lights. A tail gate 19 completes the enclosure of utility bed 11 and extends between the ends of side walls 13. Tail gate 19 is located above a bumper 21. Typically bumper 21 will have a slot 23 to provide a clearance for the rearward viewing of a vehicle license plate 25. Tailgate 19 is pivotally attached to the side walls 13 at its lower corners to allow it to be pivotally opened, as is well known for truck tail gates. Both the bumper 21 and the license plate 25 are arranged to provide clearance for the downwardly arcing pivotally opening tail gate 19, the opening of which is best shown in FIG. 7.

A combination tail light handle 27 is visible in the upper center portion of tail gate 19. Combination tail light handle 27 has a lens 29 forming its upper surface. Note that the position of combination tail light handle 27 corresponds to the location of the tail gate latch release lever on many currently operated trucks.

Figure 1:
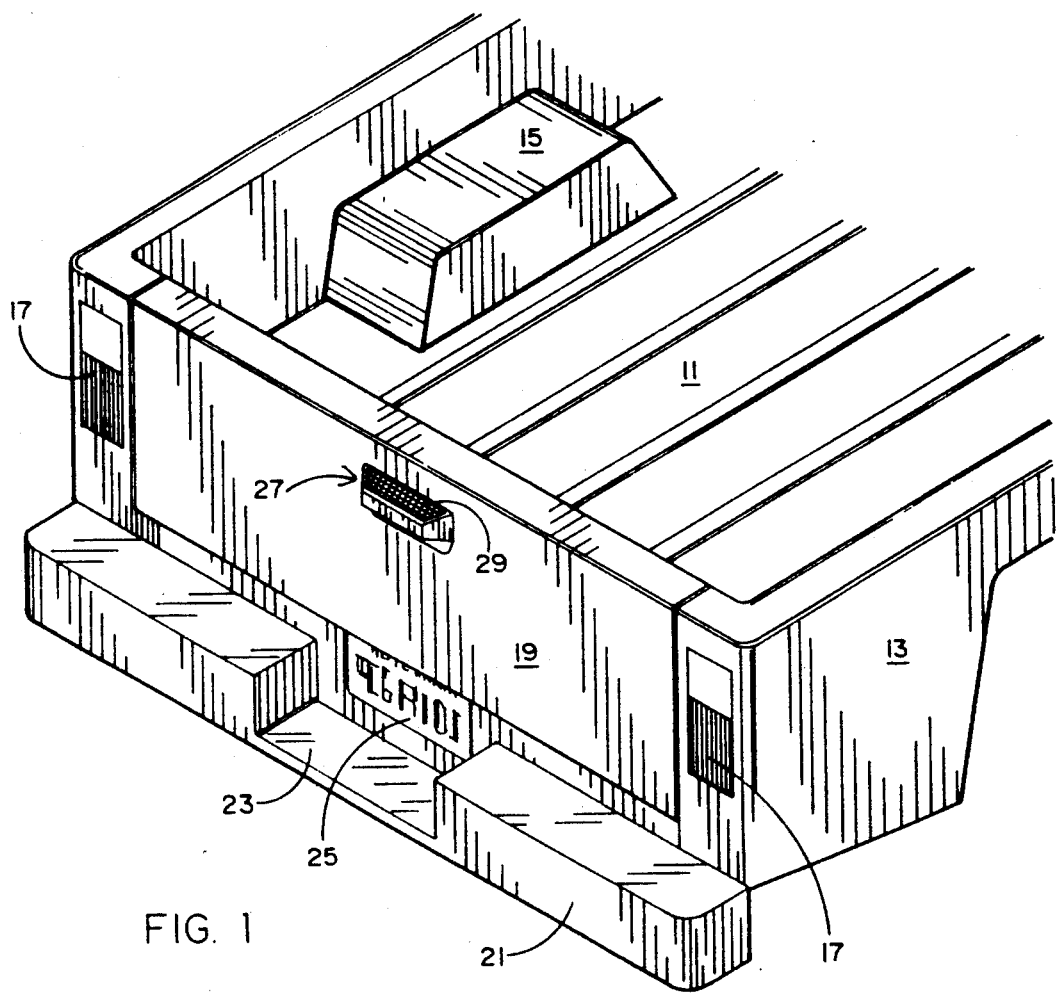
FIG. 1 is a perspective view of the bed and tailgate of a vehicle embodying the combination tail light handle of the present invention.
Figure 2:
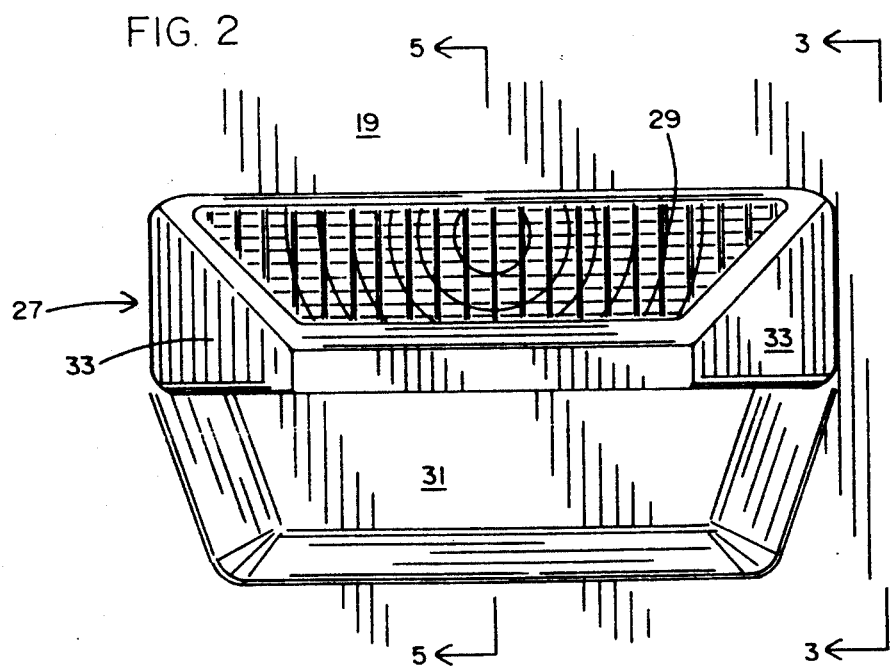
FIG. 2 is a rear view of the combination tail light handle which was illustrated in FIG. 1.

Referring to FIG. 2, combination tail light handle 27 is shown in greater detail as viewed from the rear of tail gate 19 of FIG. 1. The lens 29 of combination tail light handle 27 is trapezoidally shaped and typically constructed of a transparent material which transmits the red portion of the visible light spectrum.

Two superimposed patterns are visible with respect to lens 29. A circular fresnel pattern is formed on the inside of lens 29 to assist in the even distribution of light from a light bulb (not shown in FIG. 2) within combination tail light handle 27. On the outside of lens 29, a dispersion matrix made up of continuous vertical lines and abbreviated horizontal lines is formed into the surface thereof.

In this manner, the light energy is spread more evenly across the surface of lens 29, and then dispersed more evenly with respect to the angles of incidence deviating from an angle normal to the surface of lens 29. This diffuse emission, in other words, enables light reception according to the law of sines and cosines, equivalent to the percentage of the surface viewable by the observer. Typically, with respect to FIG. 2, the lens 29 is inclined to an angle of about forty five degrees from the vertical axis. In this manner, about seventy one percent of the available light energy is transmitted horizontally rearward from combination tail light handle 27 when the tail gate 19 is in the vertical or closed position, as is illustrated in FIG. 1.

Combination tail light handle 27 rests above an indention 31 in the surface of the tail gate 19 (best shown in FIG. 5). Indention 31 facilitates the accommodation of the fingers of the hand of the operator in grasping combination tail light handle 27, as will be described in greater detail. A pair of beveled side faces 33 are located at the extreme sides of combination tail light handle 27 to provide a less abrupt termination and facilitate the accommodation of the thumb of the hand.

Referring to FIG. 3, the combination tail light handle 27 is shown mounted on a rear wall 35 of tail gate 19. Typically, tail gate 19 will have a rear wall 35 and a front wall (not shown) which define a 15 partially hollow cavity for housing the tail gate latch mechanism. Such a latch mechanism will be best illustrated and explained in greater detail along with an explanation of the remaining Figures.

Indention 31 is seen as formed integrally with respect to rear wall 35, adjacent and slightly below combination tail light handle 27. Above indention 31 is located a latch actuation housing 37. Latch actuation housing 37 is bolted to combination tail light handle 27 through rear wall 35 with a pair of bolts 39, one of which is visible in FIG. 3.

A pair of spaced apart parallel pivot arms 41 extend upwardly and away from latch actuation housing 37. A shaft 43 extends horizontally away from latch actuation housing 37. The shaft 43 pivotally supports a first bell crank 45 and a second bell crank 47. A torsional spring 49 encircles shaft 43, and engages bell cranks 45 and 47.

Referring to FIG. 4, the face of latch actuation housing 37 is shown facing rearwardly. Torsional spring 49 has a first end 51 engaging an aperture 53 in bell crank 45, and a second end 55 engaging an aperture 57 in bell crank 47. In this manner, torsional spring 49 (of FIG. 3) urges both of the bell cranks 45 and 47 to pivot in opposite rotational directions about shaft 43 and against the parallel pivot arms 41.

A cable anchor 59 is pivotally supported by the arms of bell cranks 45 and 47 not engaging parallel pivot arms 41. A pair of cables 61 are illustrated connected to their respective cable anchors 59. The other end of cables 61 are connected to tail gate latches and will be discussed later. An electrical wire 62 supplies electrical power to the combination tail light handle 27. The source of electrical power can be derived from a battery, solar cells, a generator or other power source.

Referring to FIG. 5, an illumination cavity 63 of tail light handle 27 is shown to provide sufficient space for a light bulb 65 to adequately illuminate the lens 39. A generally planar shaped lever 67 is connected to both of the parallel pivot arms 41. The lever 67 and the parallel pivot arms 41 pivot about a common pivot axis and consequently operate in a bell crank fashion. A shaft 69, its ends attached to the latch actuation housing 37, pivotally supports and provides a common pivot axis to the lever 67 and the parallel pivot arms 41.

A hand 71 is illustrated in position to both grasp the combination tail light handle 27 and actuate the lever 67. The fingers are accommodated by the indention 31 and by a finger space 73 within the latch actuation housing. The fingers and the thumb may advantageously work in concert to pivot lever 67 outward and upward. A lever clearance space 75, in combination tail light handle 27 provides clearance for lever 67 and accommodates the lever 67 as it pivots.

Referring to FIG. 6, a side view of tail gate 19 in its operating position adjacent utility bed 11 reveals the pivot member 77 at the lower end of tail gate 19. Typically pivot member 77 may be a raised circular land or other projection to facilitate pivotal attachment to an accommodating structure on the portion of the adjacent side walls 13 facing the side edge of tail gate 19.

Near the top side edge of tail gate 19 is a wedge shaped tail gate latch 79. Tail gate latch 79 is typically wedge shaped, similar to the wedge shape of a door latch, to enable the tail gate 19 to be forced shut without the need to manually withdraw the tail gate latch 79. The wedge shape enables the tail gate latch 79 to be forcibly withdrawn into tail gate 19 upon closure to clear a restraining structure in the side walls 13, but requires manual withdrawal of the tail gate latch 79 to open the tail gate 19. Typically, a tail gate 19 will have two tail gate latches 79, one at each upper side of the outer edge of tail gate 19.

Behind tail gate latch 79 and within tail gate 19, the other ends of the cables 61, which were illustrated in FIG. 4, each engage a tail gate latch, and are operable to withdraw the tail gate latches 79 into the tail gate 19 to release the tail gate 19 from the closed position.

Referring to FIG. 7, the tail gate 19 is shown in the open position. Typically a suspension cable or arm (not shown) will limit the pivotal travel of tail gate 19 to a horizontal position. Also in FIG. 7, an aperture 81, within the end face of side walls 13, provides a space to accommodate the tail gate latch 79 when tail gate 19 is in the closed position. In this case, it is the side wall 13 which forms the restraining structure necessary to hold tail gate latch 79 and therefore tail gate 19 in closed position.

In FIG. 6, with the tail gate 19 in the vertical position, the lens 29 projects significant light along a horizontal path and in a rearward direction. In FIG. 7, with the tail gate 19 in the horizontal position, the lens 29 also projects significant light along a horizontal path and in a rear ward direction. In this manner, the combination tail light handle 27 is visually observable and visually enabled when the tail gate 19 is in both the vertical and horizontal positions.

As has been previously mentioned, the surface of lens 29 forms a forty five degree angle with respect to both the vertical and horizontal. In this manner, the lens 29 is able to project as much light in the horizontal direction while the tail gate 19 is closed as it does when the tail gate 19 is open. Deviations from the forty five degree angle are possible, but in such a case the intensity split of the horizontal component of light between the open and closed tail gate positions will vary according to the law of sines and cosines. In addition, the lens 29 may be non-planar, and varied in shape to distribute light according to the needs and requirements of tail gate 19 or other utility door.

The operation of the illuminated combination tail light handle of the present invention is best illustrated with reference to FIGS. 3-7. The user of the present invention grasps the combination tail light handle 27 adjacent the palm of the hand 71, and inserts the fingers adjacent the indention 31 and into the finger space 73. With a squeezing motion, the fingers engage the lever 67 and pivot it away from tail gate 19 and into the lever clearance space 75 of combination tail light handle 27.

As the lever 67 is pivoted outward, the parallel pivot arms 41 are pivoted downward against their respective adjacently located arms of the bell cranks 5 and 47. Both of the bell cranks 45 and 47 simultaneously pivot downward bringing the cable anchors 59 into closer proximity with each other and pulling both of the cables 61 toward the center of tail gate 19.

The movement of cables 61 toward the center of tail gate 19 causes the tail gate latches 79 to which the cables 61 are connected to withdraw into the tail gate 19. As the tail gate latches 79 are withdrawn from the apertures 81, in which they were carried while tail gate 19 was in the closed position, into the tail gate 19, the tail gate 19 is released from its vertical closed position and may be opened with the manual advantage facilitated by combination tail light handle 27, and brought to rest under the influence of gravity in the horizontal position. To close the tail gate 19, it may be raised from its resting place and forcibly closed in a conventional manner.

It is to be understood that the combination tail light handle 27 of the present invention is utilizable at various points about the surface of a vehicle. For example, instead of being wired to the tail light circuit, combination tail light handle 27 could be wired to the courtesy light circuit, and used as an illuminated side door handle. Such an illuminated side door handle could be utilized both in passenger cars and vans. Several such illuminated side door handles could be could be used on a single vehicle. Further, combination tail light handle 27 is especially useful for emergency service or in any situation where a level of light less than normal is encountered. Such situations exist in buildings whose power has failed and where combination tail light handle 27 is wired into the emergency power system. In addition, combination tail light handle 27 would be useful in dimly lit rooms, such as theaters and darkrooms, to illuminate the exit doors and door handles.

The foregoing disclosure and description of the invention are illustrative and explanatory thereof, and various changes in the type of illumination, lens, and material of construction, as well as in the details of the mechanical operation of the latch mechanism, as well as in the type of structure upon which the illuminated combination tail light handle of the present invention is mounted, may be made without departing from the spirit and scope of the invention.

What is claimed is:

1. An illuminated combination tail light handle for a vehicle having a lever operated tail gate latch mechanism, said handle further comprising:
   an exterior housing having a planar portion, and adapted for attachment to a surface, a first face extending generally perpendicular to said planar surface, said first face and said rectangular planar portion defining a clearance space opening to facilitate manual grasping of said handle and to accommodate a lever, an illumination face at an angle less than ninety degrees with respect to said planar portion; and
   means for illuminating said illumination face, attached to said exterior housing.

2. The illuminated combination tail light handle of claim 1 wherein said vehicle is equipped with a brake light system and wherein said means for illuminating said illumination face illuminates said illumination face in concert with said brake light system as a third tail light.

3. An illuminated combination tail light handle comprising:
   an exterior housing having a planar portion, including a first and a second elongated edge, and adapted for attachment to a surface, a first face extending from said first edge of said planar portion and generally perpendicular to said planar portion, said first face and said planar portion defining a clearance space opening to facilitate manual grasping of said handle, an illumination face extending from said second edge of said planar portion and at an angle less than ninety degrees with respect to said planar portion, said illumination face having an opening into an illumination cavity within said exterior housing;
   a lamp socket attached to said housing within said illumination cavity and having at least one electrical connector extending from said socket to the outside of said handle;
   an electrical lamp connected to said lamp socket; and
   a lens, parallel to said illumination face and attached to said handle, and covering said opening of said illumination face and enclosing said illumination cavity.

4. The illuminated combination tail light handle of claim 3 wherein said angle is approximately forty-five degrees.

5. The illuminated combination tail light handle of claim 3 wherein said lens has a first surface facing said lamp further comprising a fresnel lens.

6. The illuminated combination tail light handle of claim 5 wherein said lens has a second surface facing away from said lamp further comprising a dispersion grating.

7. An illuminated tail light latch handle assembly comprising:
   an exterior housing having a planar portion, including a first and a second elongated edge, and adapted for attachment to a surface, a first face extending from said first edge of said planar portion and generally perpendicular to said planar portion, said first face and said planar portion defining a clearance space opening, an illumination face extending from said second edge of said planar portion and at an angle less than ninety degrees with respect to said planar portion, said illumination face having an opening into an illumination cavity within said exterior housing;

a lamp socket attached to said housing within said illumination cavity and having at least one electrical connector extending from said socket to the outside of said handle;

an electrical lamp connected to said lamp socket;

a lens, parallel to said illumination face and attached to said handle, and covering said opening and enclosing said illumination cavity; and latch actuation means, attached opposite said exterior housing, for unlatching a latchable member.

8. The illuminated tail light latch handle assembly of claim 7 wherein said latch actuation means further comprises:

a latch actuation housing having a planar portion opposite said planar portion of said exterior housing, and an opening aligned with said opening defined by said planar portion of said exterior housing;

pivot means, having a pivot axis parallel to said first edge of said exterior housing, for providing pivoting support; and, a manually actuatable lever, pivotally supported by said pivot means.

9. The illuminated tail light latch handle assembly of claim 8 wherein said latch actuation means further comprises:

a pair of spaced apart parallel pivot arms, each pivot arm extending away from the pivot axis of said planar lever, said pivot arms simultaneously operable with said lever in a bell crank manner;

a shaft supported and extending away from said latch actuation housing in a direction away from said exterior housing;

a first bell crank pivotally supported by said shaft and having a first arm and a second arm;

a second bell crank pivotally supported by said shaft and having a first arm and a second arm;

spring means for urging said first arm of said first bell crank against one of said parallel pivot arms and for urging said first arm of said second bell crank against the other of said parallel pivot arm, the actuation of said planar lever simultaneously operating said first and second bell cranks; and latch cable anchoring means, connected to said second arms of said first and said second bell cranks, for facilitating the attachment of latch cables to said first and said second bell cranks.

10. The illuminated tail light latch handle assembly of claim 9 wherein said spring means is a torsional spring, surrounding said shaft, and having a first end connected to said first arm of said first bell crank and a second end connected to said first arm of said second bell crank.

11. A vehicle tailgate comprising the illuminated tail light latch handle assembly of claim 9 and further comprising:

a vehicle tail gate pivotally supportable upon a vehicle, said latch handle assembly attached to said tail gate;

at least one latch supported by said tail gate; and a latch cable extending from said at least one latch to said latch cable anchoring means.

* * * * *